(12) United States Patent
Devillier et al.

(10) Patent No.: US 8,863,180 B1
(45) Date of Patent: Oct. 14, 2014

(54) INTERACTIVE EPISODES

(75) Inventors: Lauren Devillier, Studio City, CA (US); Michael Peterson, Woodland Hills, CA (US); Christopher Butler, Los Angeles, CA (US); Jason Scott Byers, Sherman Oaks, CA (US)

(73) Assignee: Disney Enterprises, Inc., Burbank, CA (US)

(*) Notice: Subject to any disclaimer, the term of this patent is extended or adjusted under 35 U.S.C. 154(b) by 206 days.

(21) Appl. No.: 13/476,721

(22) Filed: May 21, 2012

(51) Int. Cl.
*H04N 5/445* (2011.01)

(52) U.S. Cl.
USPC .......... 725/37; 725/1; 725/9; 725/13; 725/22; 725/23; 725/24; 725/25; 725/32

(58) Field of Classification Search
USPC .............................. 725/13, 37, 1, 9, 22–25, 32
See application file for complete search history.

(56) References Cited

U.S. PATENT DOCUMENTS

| | | | |
|---|---|---|---|
| 2002/0178442 A1* | 11/2002 | Williams | 725/13 |
| 2010/0053557 A1* | 3/2010 | Barnett et al. | 352/101 |

* cited by examiner

*Primary Examiner* — Jivka Rabovianski
(74) *Attorney, Agent, or Firm* — Pillsbury Winthrop Shaw Pittman LLP

(57) ABSTRACT

Interactive audio-video episodes may be provided in which progression of storylines is contingent upon user interactions with the episodes. User activities may be facilitated during presentation of an episode. The user activities may be contextually related to the storyline of the presented episode. A given user activity may include a visual and/or audio queue to prompt the user to participate in the given user activity. Progression of the storyline of the presented episode may be suspended during the given user activity. One or more user interactions may be received during individual user activities facilitated during presentation of the episode. The storyline may continue to progress after the given user activity responsive to receipt of a given user interaction prompted by the given user activity.

16 Claims, 2 Drawing Sheets

INTERACTIVE EPISODES

FIELD OF THE DISCLOSURE

This disclosure relates to providing interactive audio-video episodes in which progression of storylines is contingent upon user interactions with the episodes.

BACKGROUND

Interactive episodes are known. Conventional approaches, however, do not feature activities contextual to the storyline. For example, existing interactive episodes do not have native device optimizations to drive "clicking" and "talking" to move the story forward. Instead, most existing interactive episodes merely provide bonus content or trivia about the episode.

SUMMARY

One aspect of the disclosure relates to a system configured to provide interactive audio-video episodes in which progression of storylines is contingent upon user interactions with the episodes, in accordance with one or more implementations. According to exemplary implementations, a user may view an episode via a client computing platform, such as an Apple iPhone® or iPad®. The episode may be akin to a television program in which audio and visual media convey a storyline involving an evolving plot with various characters and scenes. The episode may be interactive in that the user is queued to participate in activities while viewing the episode. The activities may be contextually related to the storyline of the episode. Progression of the storyline may be suspended during a given activity until the user has completed that activity. That is, user participation in the activities may drive progression of the storyline forward.

The system may include one or more servers, one or more client computing platforms, and/or other components. In some implementations, the server(s) may be configured to communicate with the client computing platform(s) according to a client/server architecture. According to some implementations, the client computing platform(s) may download and/or stream applications, computer program modules, episodes, and/or other information from the server(s). Users may access the system and/or episodes via the client computing platform(s).

The server(s) and/or client computing platform(s) may be configured to execute one or more computer program modules. The computer program modules may include one or more of an episode viewing module, an activity module, an interaction module, an episode selection module, an episode acquisition module, and/or other modules.

The episode viewing module may be configured to provide an episode for presentation to a user. The episode may include audio and visual media conveying a storyline involving an evolving plot with one or both of one or more characters or one or more scenes. In some implementations, aspects of the episode may be similar to a television program. The episode may be presented to the user via a client computing platform(s) 104 that is configured to facilitate user interactions with the presented episode. According to various implementations the episode may be stored locally on a given client computing platform and/or streamed to that client computing platform. In some implementations, the episode viewing module may be configured to provide a media player that is locally executed by a client computing platform. In some implementations, the episode viewing module may be configured to provide a media player that is accessed by a client computing platform via the Internet, such as with a browser.

The activity module may be configured to facilitate one or more user activities during presentation of the episode. Individual ones of the one or more user activities may be contextually related to the storyline of the presented episode. A given user activity may include a visual and/or audio queue to prompt the user to participate in the given user activity. Progression of the storyline of the presented episode may be suspended during the given user activity. In accordance with some implementations, examples of user activities include one or more of: (1) locating an object in a scene of the presented episode; (2) interacting with an object in a scene of the presented episode; (3) selecting an object from among a plurality of objects in a scene of the presented episode; (4) selecting a course of action for a character of the presented episode; (5) prompting a character of the presented episode to take an action; (6) answering a question associated with the context of the storyline; (7) providing textual or numerical information; or (8) solving a visually-presented puzzle associated with the context of the storyline. Exemplary user activities are described further herein.

The interaction module may be configured to receive one or more user interactions during individual ones of the one or more user activities facilitated during presentation of the episode. User interactions may include one or more of manual interactions, vocal interactions, and/or other interactions performed by the user with the episode and/or the client computing platform presenting the episode. Examples of manual interactions may include one or more of touching, tapping, swiping, tilting, shaking, and/or other manual interactions with the episode and/or the client computing platform presenting the episode. Examples of vocal interactions may include one or more of speaking one or more words, making one or more vocal sounds, singing one or more notes and/or songs, and/or other vocal interactions.

The storyline of the episode may continue to progress after a given user activity responsive to receipt of a user interaction prompted by that user activity. Completion of an individual user activity may be inconsequential to the plot of the storyline of the presented episode. That is, only the progression of the storyline—not the actual plot—may be affected by the user activities. In some implementations, completion of an individual user activity, or a manner in which an individual user activity is completed, may affect the plot of the storyline of the presented episode.

The overall user experience may be divided between viewing the episode and participating in activities that drive progression of the episode. By way of non-limiting example, the user may view an episode in which a character addresses the camera and says, "can you find the squirrel hiding behind the bush?" This may queue the user for an activity where the client computing platform (via the interaction module) may recognize the user's response, which could be tapping the on-screen squirrel or simply saying "yes." Responsive to the correct response by the user, presentation of the episode may continue. As another non-limiting example, a character or narrator may say, "pull that switch." Responsive to the user pulling an on-screen switch by, say, tapping and dragging the switch, the episode may continue.

There may be several levels to user activities and interactions. Some may be as simple as requesting a quick verbal response to a question, while others may be more complicated and/or involved. By way of non-limiting example, characters may encounter a series of obstacles during the course of an episode. At a given obstacle, the user may be prompted to selected an appropriate tool from a plurality of tools available to the characters. Taking the activity a step further, the user may be prompted to use the on-screen tool to overcome the obstacle. To illustrate, the characters may encounter a plurality of rubber duckies on a road. A character may address the camera and ask, "which of these tools can we use to store all of these rubber duckies and get them off the road?" The user may then select a steamer trunk from the available tools. Then, rather than just watching the characters load the trunk, the user may tap and drag each of the rubber duckies placing them one-by-one into the steamer trunk. When the task is complete, presentation of the episode may continue. There may be subsequent activities involving other available tools such as a bicycle pump or binoculars that fit within the context of the episode.

Some activities may require the user to interact with characters of the episode. For example, a character may be shown sitting on a tricycle in the episode. The user may be prompted to incite the character to ride the tricycle by chanting encouragements. The character may move responsive to the user speaking; the character may stop moving responsive to the user stopping speaking.

The episode selection module may be configured to receive a selection of one or more other episodes for presentation to the user. The selection may be received from the user via a client computing platform. The other episodes may be presented via a library of locally stored episodes and/or episodes available from sources remote from the client computing platform, in some embodiments.

The episode acquisition module may be configured to receive a selection of one or more available episodes to be acquired by the user. Acquiring a given available episode may include one or more of purchasing the given available episode, downloading the given available episode to a client computing platform, and/or otherwise acquiring an ability to present the given episode.

According to some implementations, one or more of the episode viewing module, the activity module, the interaction module, the episode selection module, and/or the episode acquisition module may be included in a software application downloaded from the server(s) and executable by the client computing platform(s). Such an application may be packaged as a single episode with an accompanying player configured to present the episode via a client computing platform. Through the player, a user may select additional episodes to purchase and/or download. In some implementations, additional episodes may become available and/or be pushed to a client computing platform on a subscription basis.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
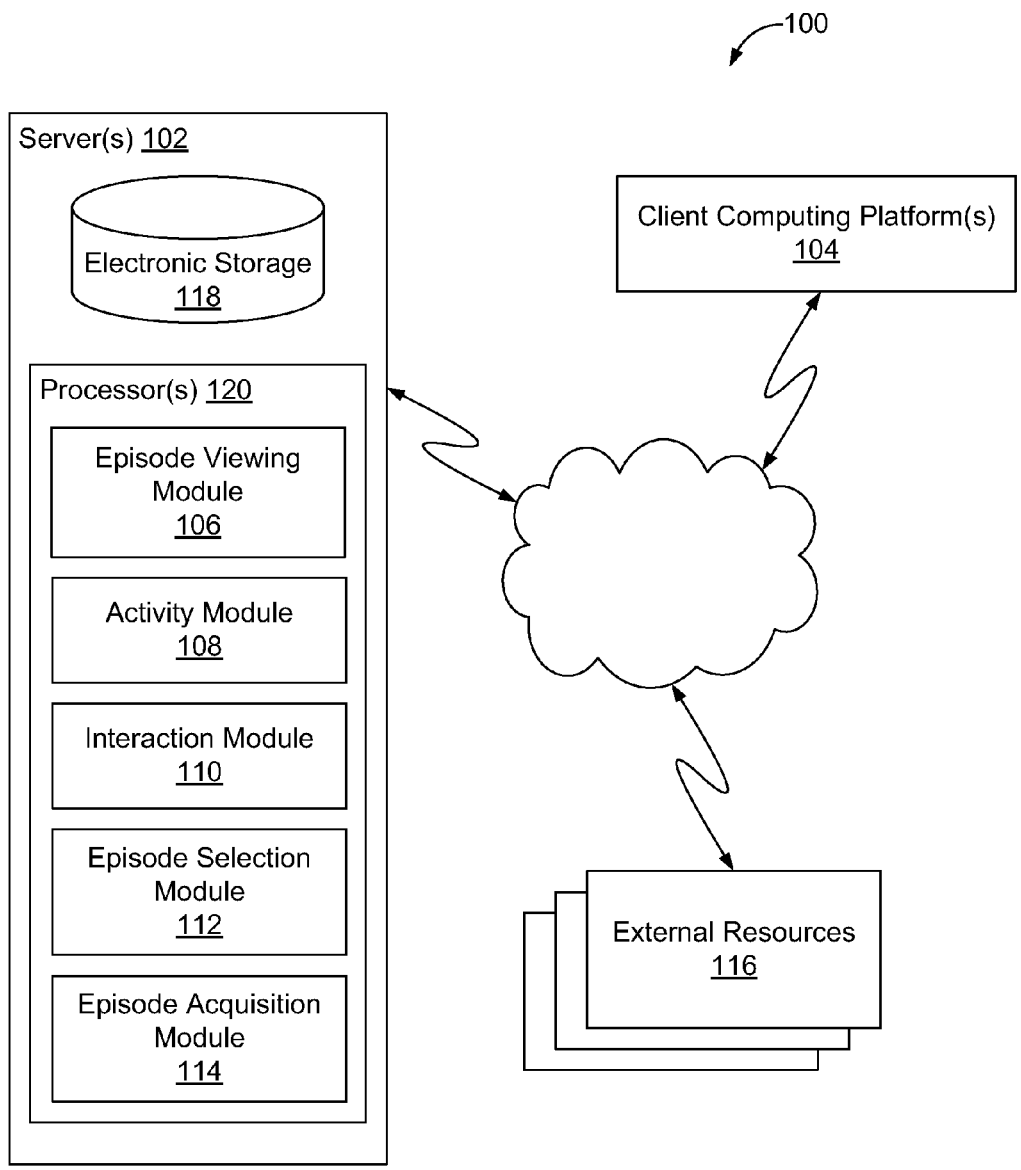
FIG. 1 illustrates a system configured to provide interactive audio-video episodes in which progression of storylines is contingent upon user interactions with the episodes, in accordance with one or more implementations.

FIG. 1 illustrates a system 100 configured to provide interactive audio-video episodes in which progression of storylines is contingent upon user interactions with the episodes, in accordance with one or more implementations. According to exemplary implementations, a user may view an episode via a client computing platform, such as an Apple iPhone® or iPad®. The episode may be akin to a television program in which audio and visual media convey a storyline involving an evolving plot with various characters and scenes. The episode may include only audio media or only visual media, in some implementations The episode may be interactive in that the user is queued to participate in activities while viewing the episode. The activities may be contextually related to the storyline of the episode. Progression of the storyline may be suspended during a given activity until the user has completed that activity. That is, user participation in the activities may drive progression of the storyline forward.

As depicted in FIG. 1, system 100 may include one or more server 102, one or more client computing platforms 104, and/or other components. In some implementations, server(s) 102 may be configured to communicate with client computing platform(s) 104 according to a client/server architecture. According to some implementations, client computing platform(s) 104 may download and/or stream applications, computer program modules, episodes, and/or other information from server(s) 102. Users may access system 100 and/or episodes via client computing platform(s) 104.

The server(s) 102 and/or client computing platform(s) 104 may be configured to execute one or more computer program modules. The computer program modules may include one or more of an episode viewing module 106, an activity module 108, an interaction module 110, an episode selection module 112, an episode acquisition module 114, and/or other modules.

The episode viewing module 106 may be configured to provide an episode for presentation to a user. The episode may include audio and visual media conveying a storyline involving an evolving plot with one or both of one or more characters or one or more scenes. In some implementations, aspects of the episode may be similar to a television program. The episode may be presented to the user via a client computing platform(s) 104 that is configured to facilitate user interactions with the presented episode. According to various implementations the episode may be stored locally on a given client computing platform 104 and/or streamed to that client computing platform 104. In some implementations, episode viewing module 106 may be configured to provide a media player that is locally executed by a client computing platform 104. In some implementations, episode viewing module 106 may be configured to provide a media player that is accessed by a client computing platform 104 via the Internet, such as with a browser.

The activity module 108 may be configured to facilitate one or more user activities during presentation of the episode. Individual ones of the one or more user activities may be contextually related to the storyline of the presented episode. A given user activity may include a visual and/or audio queue to prompt the user to participate in the given user activity.

Progression of the storyline of the presented episode may be suspended during the given user activity. In accordance with some implementations, examples of user activities include one or more of: (1) locating an object in a scene of the presented episode; (2) interacting with an object in a scene of the presented episode; (3) selecting an object from among a plurality of objects in a scene of the presented episode; (4) selecting a course of action for a character of the presented episode; (5) prompting a character of the presented episode to take an action; (6) answering a question associated with the context of the storyline; (7) providing textual or numerical information; or (8) solving a visually-presented puzzle associated with the context of the storyline. Exemplary user activities are described further herein.

The interaction module 110 may be configured to receive one or more user interactions during individual ones of the one or more user activities facilitated during presentation of the episode. User interactions may include one or more of manual interactions, vocal interactions, and/or other interactions performed by the user with the episode and/or the client computing platform 104 presenting the episode. Examples of manual interactions may include one or more of touching, tapping, swiping, tilting, shaking, and/or other manual interactions with the episode and/or the client computing platform 104 presenting the episode. Examples of vocal interactions may include one or more of speaking one or more words, making one or more vocal sounds, singing one or more notes and/or songs, and/or other vocal interactions.

The storyline of the episode may continue to progress after a given user activity responsive to receipt of a user interaction prompted by that user activity. Completion of an individual user activity may be inconsequential to the plot of the storyline of the presented episode. That is, only the progression of the storyline—not the actual plot—may be affected by the user activities. In some implementations, completion of an individual user activity, or a manner in which an individual user activity is completed, may affect the plot of the storyline of the presented episode.

The overall user experience may be divided between viewing the episode and participating in activities that drive progression of the episode. By way of non-limiting example, the user may view an episode in which a character addresses the camera and says, "can you find the squirrel hiding behind the bush?" This may queue the user for an activity where the client computing platform 104 (via the interaction module 110) may recognize the user's response, which could be tapping the on-screen squirrel or simply saying "yes." Responsive to the correct response by the user, presentation of the episode may continue. As another non-limiting example, a character or narrator may say, "pull that switch." Responsive to the user pulling an on-screen switch by, say, tapping and dragging the switch, the episode may continue.

There may be several levels to user activities and interactions. Some may be as simple as requesting a quick verbal response to a question, while others may be more complicated and/or involved. By way of non-limiting example, characters may encounter a series of obstacles during the course of an episode. At a given obstacle, the user may be prompted to selected an appropriate tool from a plurality of tools available to the characters. Taking the activity a step further, the user may be prompted to use the on-screen tool to overcome the obstacle. To illustrate, the characters may encounter a plurality of rubber duckies on a road. A character may address the camera and ask, "which of these tools can we use to store all of these rubber duckies and get them off the road?" The user may then select a steamer trunk from the available tools. Then, rather than just watching the characters load the trunk, the user may tap and drag each of the rubber duckies placing them one-by-one into the steamer trunk. When the task is complete, presentation of the episode may continue. There may be subsequent activities involving other available tools such as a bicycle pump or binoculars that fit within the context of the episode.

Some activities may require the user to interact with characters of the episode. For example, a character may be shown sitting on a tricycle in the episode. The user may be prompted to incite the character to ride the tricycle by chanting encouragements. The character may move responsive to the user speaking; the character may stop moving responsive to the user stopping speaking.

The episode selection module 112 may be configured to receive a selection of one or more other episodes for presentation to the user. The selection may be received from the user via a client computing platform 104. The other episodes may be presented via a library of locally stored episodes and/or episodes available from sources remote from the client computing platform 104, in some embodiments.

The episode acquisition module 114 may be configured to receive a selection of one or more available episodes to be acquired by the user. Acquiring a given available episode may include one or more of purchasing the given available episode, downloading the given available episode to a client computing platform 104, and/or otherwise acquiring an ability to present the given episode.

According to some implementations, one or more of modules 106, 108, 110, 112, and/or 114 may be included in a software application downloaded from server(s) 102 and executable by client computing platform(s) 104. Such an application may be packaged as a single episode with an accompanying player configured to present the episode via a client computing platform 104. Through the player, a user may select additional episodes to purchase and/or download. In some implementations, additional episodes may become available and/or be pushed to a client computing platform 104 on a subscription basis.

In some implementations, The server(s) 102, client computing platform(s) 104, and/or external resources 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 116 may be operatively linked via some other communication media.

A given client computing platform 104 may include electronic storage and/or one or more processors configured to execute computer program modules including episode viewing module 106, activity module 108, interaction module 110, episode selection module 112, episode acquisition module 114, and/or other modules. In some implementations, the computer program modules may be configured to enable an expert or user associated with the given client computing platform 104 to interface with system 100 and/or external resources 116, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

The external resources 116 may include sources of information, hosts and/or providers of episodes outside of system 100, external entities participating with system 100, and/or other resources. In some implementations, some or all of the functionality attributed herein to external resources 116 may be provided by resources included in system 110.

The server(s) 102 may include electronic storage 118, one or more processors 120, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise electronic storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platform(s) 104, and/or other information that enables server(s) 102 to function as described herein. Electronic storage of a given client computing platform 104 may be the same as or similar to electronic storage 118.

The processor(s) 120 may be configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. The processor(s) 120 may be configured to execute modules 106, 108, 110, 112, 114, and/or other modules. The processor(s) 120 may be configured to execute modules 106, 108, 110, 112, 114, and/or other modules by software; hardware; firmware; some combination of software, hardware, and/or firmware; and/or other mechanisms for configuring processing capabilities on processor(s) 120. One or more processors of a given client computing platform 104 may be the same as or similar to processor(s) 120.

It should be appreciated that although modules 106, 108, 110, 112, and 114 are illustrated in FIG. 1 as being co-located within a single processing unit, in implementations in which processor(s) 120 includes multiple processing units, one or more of modules 106, 108, 110, 112, and/or 114 may be located remotely from the other modules. The description of the functionality provided by the different modules 106, 108, 110, 112, and/or 114 described below is for illustrative purposes, and is not intended to be limiting, as any of modules 106, 108, 110, 112, and/or 114 may provide more or less functionality than is described. For example, one or more of modules 106, 108, 110, 112, and/or 114 may be eliminated, and some or all of its functionality may be provided by other ones of modules 106, 108, 110, 112, and/or 114. As another example, processor(s) 120 may be configured to execute one or more additional modules that may perform some or all of the functionality attributed below to one of modules 106, 108, 110, 112, and/or 114.

Figure 2:
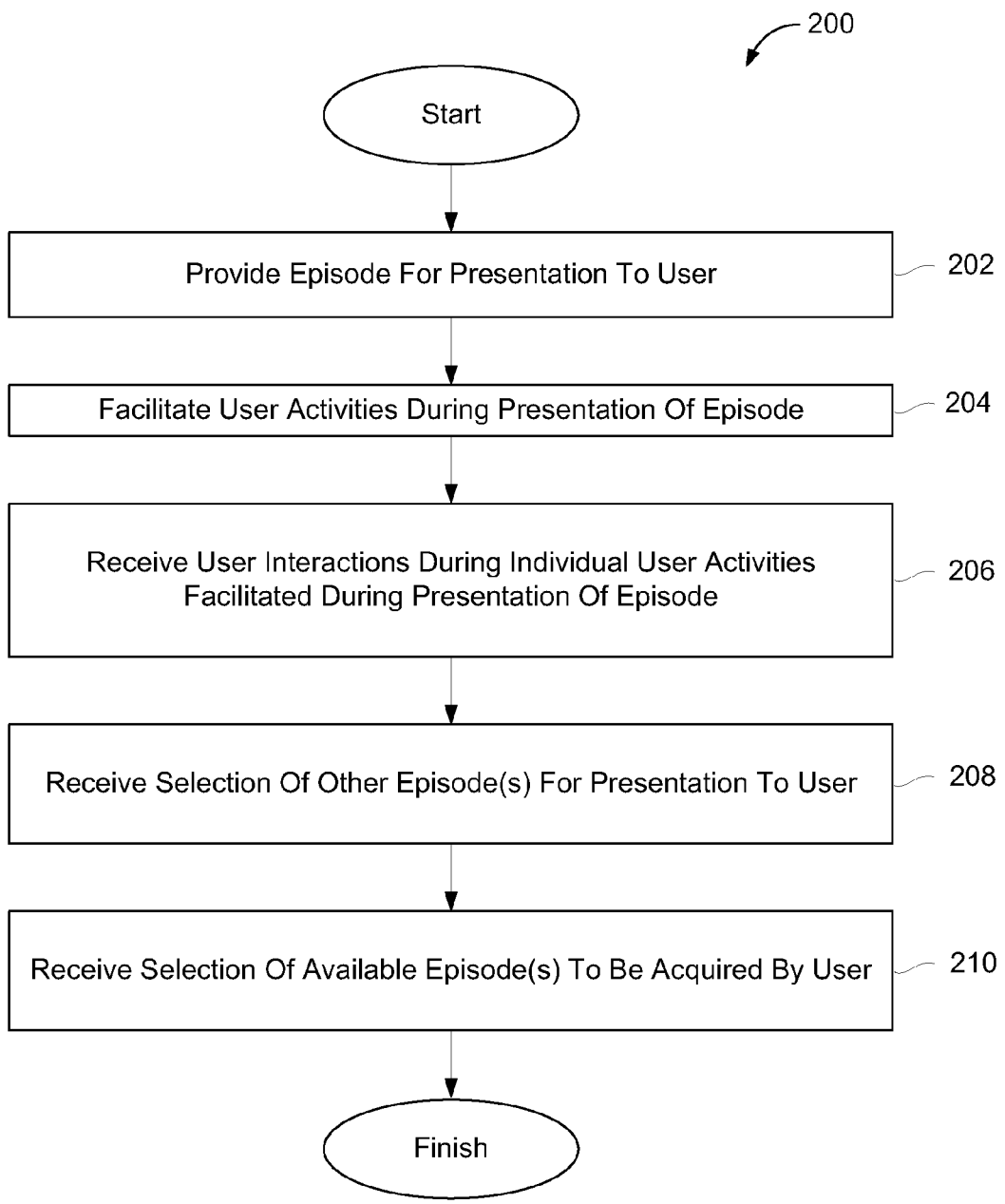
FIG. 2 illustrates a method of providing interactive audio-video episodes in which progression of storylines is contingent upon user interactions with the episodes, in accordance with one or more implementations.

FIG. 2 illustrates a method 200 of providing interactive audio-video episodes in which progression of storylines is contingent upon user interactions with the episodes, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an episode may be provided for presentation to a user. The episode may include audio and visual media conveying a storyline involving an evolving plot with one or both of one or more characters or one or more scenes. Operation 202 may be performed by an episode viewing module that is the same as or similar to episode viewing module 106, in accordance with one or more implementations.

At an operation 204, one or more user activities may be facilitated during presentation of the episode. The one or more user activities may include a first user activity. Individual ones of the one or more user activities may be contextually related to the storyline of the presented episode. A given user activity may include a visual and/or audio queue to prompt the user to participate in the given user activity. Progression of the storyline of the presented episode may be suspended during the given user activity. Operation 204 may be performed by an activity module that is the same as or similar to activity module 108, in accordance with one or more implementations.

At an operation 206, one or more user interactions may be received during individual ones of the one or more user activities facilitated during presentation of the episode. The storyline may continue to progress after the first user activity responsive to receipt of a first user interaction prompted by the first user activity. Operation 206 may be performed by an interaction module that is the same as or similar to interaction module 110, in accordance with one or more implementations.

At an operation 208, a selection may be received of one or more other episodes for presentation to the user. The one or more other episodes may be stored locally by a client computing platform (e.g., client computing platform(s) 104 or streamed to the client computing platform, such as from server(s) 102. Operation 208 may be performed by an episode selection module that is the same as or similar to episode selection module 112, in accordance with one or more implementations.

At an operation 210, a selection may be received of one or more available episodes to be acquired by the user. Acquiring a given available episode includes one or both of purchasing the given available episode or downloading the given available episode to a client computing platform. Operation 210 may be performed by an episode acquisition module that is the same as or similar to episode acquisition module 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide interactive episodes in which progression of storylines is contingent upon user interactions with the episodes, the system comprising:
 one or more processors configured to execute computer program modules, the computer program modules comprising:
  an episode viewing module configured to provide an episode for presentation to a user, the episode including one or both of audio media or visual media conveying a storyline involving a plot with one or both of one or more characters or one or more scenes;
  an activity module configured to facilitate one or more user activities during presentation of the episode including a first user activity, individual ones of the one or more user activities being contextually related to the storyline of the presented episode, a given user activity including a visual and/or audio queue to prompt the user to participate in the given user activity, wherein progression of the storyline of the presented episode is suspended during the given user activity; and
  an interaction module configured to receive one or more user interactions during individual ones of the one or more user activities facilitated during presentation of the episode, wherein the storyline continues to progress after the first user activity responsive to receipt of a first user interaction;
  wherein completion of individual ones of the user activities is inconsequential to the plot of the storyline of the presented episode.

2. The system of claim 1, wherein the episode is presented to a user via a client computing platform configured to facilitate user interactions with the presented episode.

3. The system of claim 1, wherein the one or more user activities include one or more of:
 locating an object in a scene of the presented episode;
 interacting with an object in a scene of the presented episode;
 selecting an object from among a plurality of objects in a scene of the presented episode;
 selecting a course of action for a character of the presented episode;
 prompting a character of the presented episode to take an action;
 answering a question associated with the context of the storyline;
 providing textual or numerical information; or
 solving a visually-presented puzzle associated with the context of the storyline.

4. The system of claim 1, wherein the one or more user interactions include one or both of a manual interaction or a vocal interaction performed by the user.

5. The system of claim 4, wherein the manual interaction includes one or more of touching, tapping, swiping, tilting, or shaking a client computing platform, and wherein the vocal interaction includes speaking one or more words.

6. The system of claim 1, wherein the computer program modules further comprise an episode selection module configured to receive a selection of one or more other episodes for presentation to the user.

7. The system of claim 6, wherein the one or more other episodes are stored locally by a client computing platform or streamed to the client computing platform.

8. The system of claim 1, wherein the computer program modules further comprise an episode acquisition module configured to receive a selection of one or more available episodes to be acquired by the user, wherein acquiring a given available episode includes one or both of purchasing the given available episode or downloading the given available episode to a client computing platform.

9. A method of providing interactive episodes in which progression of storylines is contingent upon user interactions with the episodes, the method being performed by one or more processors configured to execute computer program instructions, the method comprising:
 using one or more processors to provide an episode for presentation to a user, the episode including one or both of audio media or visual media conveying a storyline involving a plot with one or both of one or more characters or one or more scenes;
 using one or more processors to facilitate one or more user activities during presentation of the episode including a first user activity, individual ones of the one or more user activities being contextually related to the storyline of the presented episode, a given user activity including a visual and/or audio queue to prompt the user to participate in the given user activity, wherein progression of the storyline of the presented episode is suspended during the given user activity; and
 using one or more processors to receive one or more user interactions during individual ones of the one or more user activities facilitated during presentation of the episode, wherein the storyline continues to progress after the first user activity responsive to receipt of a first user interaction;
 wherein completion of individual ones of the user activities is inconsequential to the plot of the storyline of the presented episode.

10. The method of claim 9, wherein the episode is presented to a user via a client computing platform configured to facilitate user interactions with the presented episode.

11. The method of claim 9, wherein the one or more user activities include one or more of:
 locating an object in a scene of the presented episode;
 interacting with an object in a scene of the presented episode;

selecting an object from among a plurality of objects in a scene of the presented episode;

selecting a course of action for a character of the presented episode;

prompting a character of the presented episode to take an action;

answering a question associated with the context of the storyline;

providing textual or numerical information; or solving a visually-presented puzzle associated with the context of the storyline.

12. The method of claim 1, wherein the one or more user interactions include one or both of a manual interaction or a vocal interaction performed by the user.

13. The method of claim 12, wherein the manual interaction includes one or more of touching, tapping, swiping, tilting, or shaking a client computing platform, and wherein the vocal interaction includes speaking one or more words.

14. The method of claim 9, further comprising receiving a selection of one or more other episodes for presentation to the user.

15. The method of claim 14, wherein the one or more other episodes are stored locally by a client computing platform or streamed to the client computing platform.

16. The method of claim 9, further comprising receiving a selection of one or more available episodes to be acquired by the user, wherein acquiring a given available episode includes one or both of purchasing the given available episode or downloading the given available episode to a client computing platform.

* * * * *